Patented June 4, 1940

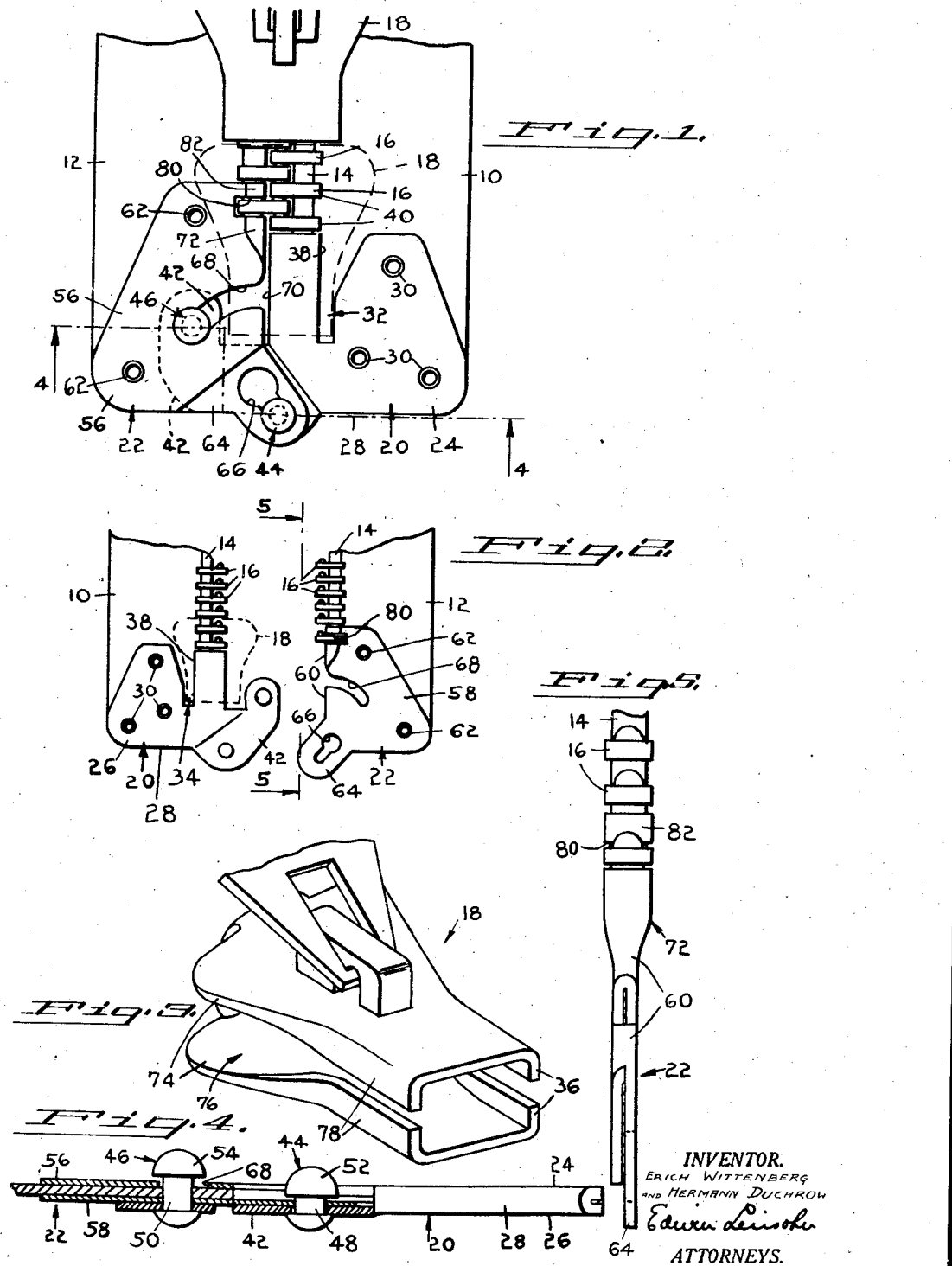

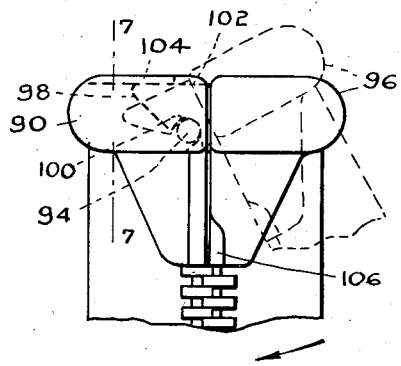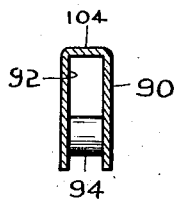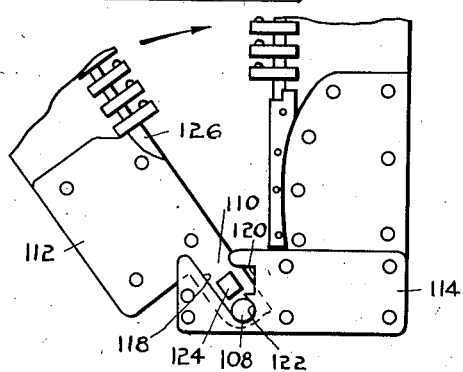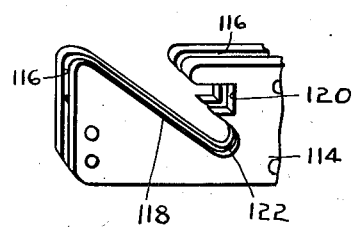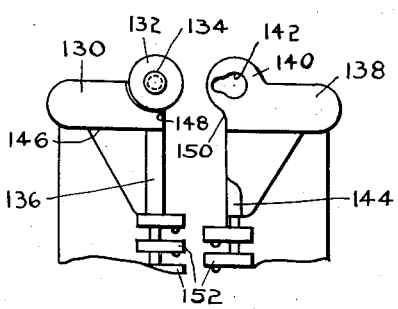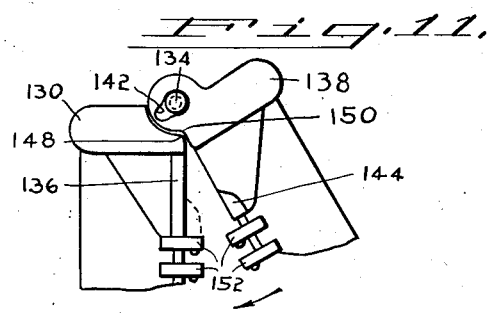

2,203,005

UNITED STATES PATENT OFFICE 2,203,005

SEPARABLE FASTENER AND DETACHABLE END CONNECTING MEMBER THEREFOR

Erich Wittenberg, Berlin-Schoneberg, and Hermann Duchrow, Rathenow-on-the-Havel, Germany Application January 7, 1938, Serial No. 183,858
In Czechoslovakia January 7, 1937

10 Claims. (Cl. 24—205)

This invention relates to separable fasteners and more particularly to slide operated fasteners having completely separable stringers and for that purpose are provided with separable end connecting members.

One object of the invention is the provision of improved separable end connecting members for slide fasteners constructed and arranged to permit the ends of the stringers to be connected and disconnected under the control of the slider.

Another object of the invention is to provide a slide fastener with separable end connecting members which cooperate with the slider to provide for the proper interengagement of the locking elements with each other upon movement of the slider to fastener closing position.

A further object of the invention is the provision of separable end connecting members associated in such manner with certain of the interlocking elements that proper positioning of such elements is assured when the separable connecting members are positioned to permit movement of the slider to closing position and to prevent such movement of the slider unless the interlocking elements referred to are in position for proper interengagement with each other.

Another object is to provide separable end connecting members which are of simple and rugged construction and which are reliable in operation.

The above objects of the invention and other objects ancillary thereto will be fully understood from the following description considered with reference to the accompanying drawings.

In the drawings:

Fig. 1 is a fragmentary plan view on an enlarged scale of the front side of a slide fastener embodying the present invention showing the stringers connected together by the separable end connecting members;

Fig. 2 is a fragmentary plan view, on a smaller scale, of the other side of the slide fastener illustrated in Fig. 1, showing the stringers completely disconnected from each other;

Fig. 3 is a perspective view of the slider;

Fig. 4 is a sectional view on the line 4—4 of Fig. 1;

Fig. 5 is an end view on the line 5—5 of Fig. 2, on a larger scale;

Fig. 6 is a view similar to Fig. 1 showing a modification;

Fig. 7 is a section on the line 7—7 of Fig. 6;

Fig. 8 is a plan view showing another form of the invention;

Fig. 9 is a perspective view of a part of the fastener shown in Fig. 8;

Fig. 10 is a plan view of the modified form of the fastener showing the stringers completely separated;

Fig. 11 is a view similar to Fig. 10 showing the stringers partially connected.

Referring now more particularly to the drawings, the slide fastener comprises the usual companion stringers 10 and 12 made of woven fabric and provided with beaded edges 14 to which the interlocking elements 16 are secured in the usual way. A slider 18 is movable longitudinally of stringers 10 and 12 in engagement with said interlocking elements for meshing and unmeshing the latter for opening and closing the fastener. The slider 18 may be of any type and of any suitable construction modified, however, as hereinafter described, for the purpose of the present invention. Separable end connecting members 20 and 22, made in accordance with the present invention, are attached to uncorded end portions of stringer 10 and 12, respectively. Said separable end connecting members will now be described in detail.

Member 20 is made of bendable sheet metal and comprises a front plate 24 and a rear plate 26 integral with each other and united by a bent edge portion 28. Said plates 24 and 26 engage opposite sides of stringer 10 and are firmly secured to the latter in any suitable means, here shown as hollow rivets 30. Slots 32 and 34 are formed in plates 24 and 26, respectively, for receiving one side of slider 18, specifically portions of slider flanges 36. The slot defining edges 38 of plates 24 and 26 extend somewhat beyond the inner edges 40 of the interlocking elements. Rear plate 26 is provided with a hook 42 integral therewith and projecting toward separable connecting member 22. Said hook is offset somewhat rearwardly of the plane of plate 26 as indicated in Fig. 4. A pivot and connecting pin 44 is riveted to hook 42 adjacent the lower edge thereof and a guide and connecting pin 46 is riveted to said hook adjacent the upper edge of the latter. Pins 44 and 46 are provided with shanks 48 and 50, respectively, and heads 52 and 54, respectively. Separable end connecting member 22 comprises a front plate portion 56 and a rear plate portion 58 integral with each other and united by a folded edge portion 60 extending longitudinally of stringer 12. Said plates are engaged with opposite sides of stringer 12 and are secured thereto by any suitable means, here shown as hollow rivets 62. Plate 58 is provided with a projecting portion 64 having a key-shaped slot or opening 66 having relatively wide and narrow parts as shown. An arcuate slot or recess 68 is formed in connecting member 22 through both plates of the latter.

As shown, members 20 and 22 are connected by engaging pin 44 in slot 66, first through the larger or wider part of said slot which permits the head 52 of said pin to enter the slot and then in the smaller or narrower part of slot 66 which releasably retains said pin as head 52 of the latter is larger than said part of slot 66. When pin 44 is in the position illustrated in Fig. 1, pin 46 is engageable with plate 22 and is releasably retained in slot 68 for movement therein due to the fact that head 54 of said pin is larger than the width of said slot. In this position of the parts, the center of the arc of slot 68 coincides with the axis of pivot pin 44 when said pin is in engagement with the smaller part of slot 66. When the parts are thus positioned plate 22 is pivotally engaged with plate 20 with plate portions 42 and 64 in overlapping relation, and are guided in said movement by pin 46 toward and away from the adjacent edge 70 of plate 20. When the shank of pin 46 is in engagement with the closed end of slot 68, edges 60 and 70 of plates 22 and 20, respectively, are in abutting relation.

Plate 22 is provided with an enlarged marginal edge portion 72 above slot 68 and increases in width progressively in the direction of the movement of slider 18 for meshing the interlocking elements. Said cam portion 72 cooperates with slider 18 for bringing the end-most interlocking elements into engagement with each other upon the initial movement of the slider to stringer closing position. For this purpose portions 74 of the side flanges on slider 18 at one side thereof are reduced in width to provide an enlarged opening 76 for the passage of cam 72 laterally of the slider. Flange portions 78 at said side of the slider are of normal width for engagement with cam 72 after the latter is positioned within the slider and during the initial movement of the latter to stringer closing position. Thus when slider 18 is in the position shown in dotted lines in Fig. 1, cam 72 is disposed laterally of opening 76 in the adjacent side of slider 18 whereby plate 20 may be moved laterally of the slider through the plates between the confronting edges of the slider flanges. Lateral movement of plate 22 into and out of the slider is guided by the overlapping relation of plate portions 42 and 64 and by the engagement of pin 46 in slot 68, and this arrangement also prevents transverse movement of plates 20 and 22 while they are thus connected.

Plate 22 is provided with a slot 80 in its side edge 60 in the cam portion 72 thereof within which an interlocking element 16 is positioned for engagement with the two end-most interlocking elements 16 on the opposite stringer. The edge portion 82 of plate 22 beyond slot 80 is substantially equal in thickness to the space between two interlocking elements on the same stringer. Thus interlocking element 16 positioned within slot 80 is movable laterally between the two end-most interlocking elements on the opposite stringer when plate 22 is moved laterally of the slider about pin 44 as a pivot, thus properly positioning the end-most interlocking elements so that movement of the slider to stringer closing position insures a proper engagement of the successive interlocking elements with each other.

In view of the above description, the manner of using or manipulating the slide fastener equipped with the separable end connecting members herein disclosed will be obvious. Briefly described, however, it is as follows: Assuming that the stringers are completely disconnected, as illustrated in Fig. 2, and it is desired to connect them together, slider 18 is positioned as shown in dotted lines and pin 44 is engaged in key-slot 66 and the parts positioned so that pin 46 is movable longitudinally of slot 68. When thus positioned member 22 is moved toward plate 20 and laterally between flange portion 74 and flange portion 78 in the adjacent side of slider 18, cam portion 72 passing through opening 76 between flange portions 74. With the parts thus positioned slider 18 is then moved longitudinally of the stringers away from said end connecting members and by engagement of flange portion 78 with cam portion 72 causes the end-most elements to mesh with each other and upon continued movement of said slider the interlocking elements are progressively brought into engagement with each other throughout the extent of movement of said slider to stringer closing position. When it is desired to disconnect the stringers, the slider 18 is moved to the stringer opening position, indicated in dotted lines in Fig. 1, in which position the slider opening 76 is in alignment with cam portion 72 of plate 22. In said position of the parts, plate 22 may be pivoted outwardly away from plate 20 and laterally beyond slider 18, and then further in the same direction to disengage pin 46 from slot 68, after which plate 22 may be disengaged from pin 44.

In accordance with the form of the invention illustrated in Figs. 6 and 7 of the drawings, the separable connecting member 90, secured to one of the stringers, is U-shaped and is provided with a guide opening 92 and with a cross pin 94. The other separable connecting member 96 is provided with a projection 98 having a recess 100 which engages pin 94 of member 90. In the dotted line position of member 96, projection 98 of said member is insertable into the guide slot 92 of connecting member 90 and upon movement of member 96 in the direction of the arrow through the adjacent side slot of the slider (not shown) member 96 is pivoted about pin 94 into position shown in full lines. Member 96 is provided with a cam enlargement 106 similar to the cam enlargement 72 of the form of the invention illustrated in Fig. 1 and co-acts with the slider in the same manner as said cam enlargement 72. When projection 98 is inserted in opening 92 the opposite sides of said projection having a sliding fit with the adjacent inner walls of member 92 and when member 96 is moved into its full line position the outer edge 102 of projection 98 engages the end wall portion 104 of U-shaped member 92. In this manner, said separable connecting members 90 and 96 are coupled together against unintentional displacement either transversely or in a longitudinal direction and are thus positioned in the same plane and are releasably held in said position.

In the form of the invention illustrated in Figs. 8 and 9, there is a pin 108 on the projection 110 of separable connecting member 112. The companion separable connecting member 114 is provided with an entrance slot 116, an angular slot 118 and a recess or slot 120. The inner end 122 of slot 118 provides a bearing for pin 108, said pin extending on opposite sides of projection 110. Projection 110 of member 112 is also provided with a rectangular shaped stud 124 which extends laterally beyond opposite sides of said projection and is received in recess 120 when the stringer provided with said separable connecting member 112 is moved in the direction of the arrow indicated in Fig. 8 for positioning said connecting member within the slider (not shown). It will be understood that in connecting the ends of the stringers, the parts are positioned initially as illustrated in Fig. 8 with pin 108 received in bearing recess 122 and with the projection 110 engaging member 114 in slot 116 thereof. For closing the fastener, the connecting member 112 is moved in the direction of the arrow to project the same laterally through the side slot of the slider in the same way as described above in connection with the other forms of the invention. Said connecting member 112 is provided with a cam enlargement 126 which is similar in construction and has the same function as the cam enlargement 72 of the form of the invention illustrated in Fig. 1.

In the form of the invention illustrated in Figs. 10 and 11, the separable connecting member 130 is provided with a plate projection 132 having a headed pin 134. Member 130 has a portion 136 which extends longitudinally of the stringer at the ribbed edge thereof serving to stiffen the latter. The other separable connecting member 138 is provided with a projecting plate portion 140 having a key-hole slot 142 therein. For assembling the two stringers and the engagement of the separable connecting members 130 and 138, the larger part of key-hole slot 142 receives the headed portion of pin 134, and the arrangement is such that when the stringers are in connected relation parallel to each other, the narrower part of said key-hole slot engages the pin below its headed portion whereby said separable connecting members are pivotally connected in releasable relation. When connecting member 138 is moved in the direction indicated by the arrow in Fig. 11, the edges 148 and 150 of the two connecting members engage each other forcing pin 134 into the smaller part of slot 142 and prevent movement of said pin in said slot when the interlocking elements 152 are engaged with each other. Separable connecting member 138 is provided with a cam enlargement 144 similar in construction and having the same function as cam enlargement 72 in the form of the invention illustrated in Fig. 1. It will be understood that the slider (not shown) is retained on the stringer provided with separable connecting member 130 even when said stringers are completely disconnected, the shoulder-forming portion 146 on member 130 serving as a stop for the slider to prevent its moving off the stringer.

As in the other forms of the invention hereinbefore described, the separable connecting members are pivotally connected together and one of said connecting members 138 is movable laterally of the slider through the slide slot thereof for connecting the stringers together and for disconnecting them from each other. It will be understood also that in the forms of the invention illustrated in Figs. 6 to 11, the slider may be of the same construction as that illustrated in Fig. 3, or may be otherwise constructed to permit the cam enlargements of the several connecting members of the various forms of the invention to pass laterally into the slider channel when initiating the closing of the fastener.

Thus it is seen that the constructions herein shown and described are each well adapted to accomplish the several objects of the present invention. It will be understood, however, that the invention may be embodied otherwise than as here shown and that certain changes in the construction and arrangement of parts may be made. Therefore, we do not wish to be limited precisely to the present disclosure or to any part thereof, except as may be required by the appended claims considered with reference to the prior art.

Having thus described our invention, what we claim and desire to secure by Letters Patent is:

1. A separable fastener comprising companion stringers, a connecting member secured to one of said stringers, a connecting member secured to the other of said stringers, a detachable pin and slot connection between said connecting members, one of said members being pivotally movable in relation to said other member about said pin, in engagement with the pin of said connection, said members being also relatively movable in a direction transversely of said pin for connecting and disconnecting said members, and a releasable pin and slot connection between said members operative when said last mentioned pin is in said last mentioned slot to prevent said relative transverse movement of said connecting members thereby to prevent the disconnection thereof, said last mentioned slot being open at one end thereof to permit said last mentioned pin to be moved into and out of the same.

2. A separable fastener comprising companion stringers, a connecting member secured to one of said stringers, a connecting member secured to the other of said stringers, and a detachable connection between said connecting members comprising a plurality of pins in fixed relation to one of said members and a plurality of slots in the other of said members in which said pins are engaged, one of said pins and its companion slot providing a releasable pivotal connection between said members, said members being also relatively movable transversely of said last mentioned pin for connecting and disconnecting said members, and the other pin and its companion slot releasably preventing said relative transverse movement of said members and holding said members in pivotal relation, said other pin having a shank engageable in its companion slot and having a head wider than said slot and engaging the outer surface of the connecting member having said last mentioned slot.

3. A separable fastener comprising companion stringers, a connecting member secured to one of said stringers, a connecting member secured to the other of said stringers, and a detachable connection between said connecting members comprising a plurality of pins in fixed relation to one of said members and a plurality of slots in the other of said members in which said pins are engaged, one of said pins and its companion slot providing a releasable pivotal connection between said members, and the other pin and its companion slot releasably holding said members in pivotal relation, said last mentioned slot being arcuate and having a curvature the center of which is coincident with the axis of the pin engageable in the other slot when said pins are engaged in said slots.

4. A separable fastener comprising companion stringers provided with interlocking elements, a slider for meshing and unmeshing said elements to close and open the fastener, a connecting member secured to one of said stringers, a connecting member secured to the other of said stringers, and a detachable connection between said connecting members comprising a plurality of pins in fixed relation to one of said members and a plurality of slots in the other of said members in which said pins are engaged, one of said pins and its companion slot providing a releasable pivotal connection between said members, said members being also relatively movable transversely of said last mentioned pin for connecting and disconnecting said members, and the other pin and its companion slot releasably preventing said relative transverse movement of said members and holding said members in pivotal relation, the slot providing said pivotal connection being a key-hole slot and the pin engageable therein having a head insertable into and out of the larger portion of said key-hole slot by relative movement of said connecting members axially of said headed pin, said movement of the connecting members being prevented by said head when the pin provided therewith is in the smaller portion of said key-hole slot.

5. A separable fastener comprising companion stringers provided with interlocking elements, a slider for meshing and unmeshing said elements to close and open the fastener, a connecting member secured to one of said stringers, a connecting member secured to the other of said stringers, and a detachable connection between said connecting members, one of said connecting members on one of said stringers extending longitudinally of certain of the interlocking elements on the other of said stringers and provided with a slot, an interlocking element secured to said stringer to which said longitudinally extending member is secured and positioned in said slot and automatically engageable with and disengageable from said last mentioned elements upon predetermined relative movement of said members in different directions, respectively, said slider having a side opening of varying width, one of said connecting members being movable laterally of the slider through said opening, and an enlargement on said last mentioned connecting member laterally movable only through the larger portion of said slider opening and restrained against said movement by engagement thereof with side portions of the slider adjacent the narrower part of said opening, said slot being formed in said enlargement.

6. A separable fastener comprising companion stringers, a connecting member secured to each of said stringers for detachably connecting them together at their adjacent ends, each of said members comprising plate portions secured to the stringer on opposite sides thereof, said members having projecting plate portions constructed and arranged to be secured together in movable overlapping relation, one of said plate portions having a plurality of slots, and the other of said plate portions having a plurality of pins releasably engageable in said slots, respectively, said members being pivotally movable about the axis of one of said pins and also relatively movable transversely of said pin axis, the other pin when in its companion slot preventing said transverse movement of said members and movable out of said companion slot thereby to permit said transverse movement of said members, said companion slot of said other pin being open at one end thereof to permit said other pin to be moved into and out of the same.

7. A separable fastener comprising companion stringers, a connecting member secured to each of said stringers for detachably connecting them together at their adjacent ends, each of said members comprising plate portions secured to the stringer on opposite sides thereof, said members having projecting plate portions constructed and arranged to be secured together in movable overlapping relation with one of said projecting plate portions between the opposite sides of said other plate portion, said other plate portion having a plurality of recesses and the first plate portion having a bearing pin and a stud respectively engageable in said recesses, said bearing pin and stud extending from the side surface of said first plate portion.

8. A separable fastener comprising companion stringers, first and second connecting members secured to said companion stringers, respectively, releasable interengaging means on said connecting members engageable with each other for pivotally connecting said members together in detachable relation, said interengaging means comprising a projection on said first connecting member extending laterally from the side thereof, said second connecting member having an opening in which said projection engages said second connecting member, said second connecting member having a second opening, and another projection on said first connecting member extending laterally from the side thereof and releasably engageable with said second connecting member in said second opening for holding said connecting members releasably in said pivotally connected relation.

9. A separable fastener comprising companion stringers, a connecting member secured to one of said stringers, a connecting member secured to the other of said stringers, and a detachable connection between said connecting members comprising a plurality of pins in fixed relation to one of said members and a plurality of slots in the other of said members in which said pins are engaged, one of said pins and its companion slot providing a releasable pivotal connection between said members, and the other pin and its companion slot releasably holding said members in pivotal relation, said last mentioned slot being arcuate and having a curvature the center of which is coincident with the axis of the pin engageable in the other slot, when said pins are engaged in said slots, said other slot having relatively wide and narrow parts, said arcuate slot and its companion pin being positioned so that said companion pin can engage in said arcuate slot only when said pivot pin is in the narrow part of said other slot.

10. A separable fastener comprising companion stringers, first and second connecting members secured to said companion stringers, respectively, a pin on said first connecting member, said second connecting member having a slot provided with relatively wide and narrow parts, said pin being insertable in said slot through said relatively wide part thereof and movable from the latter into said relatively narrow part of the slot for pivotally connecting said members to each other for movement about the axis of said pin toward and away from each other in edge to edge relation, and means on said connecting members, respectively, engageable with each other when said members are moved toward each other about the axis of said pin for releasably holding said pin in said relatively narrow part of the slot.

ERICH WITTENBERG.
HERMANN DUCHROW.